July 29, 1930.

V. MONROE 1,771,808

FISHING TOOL

Filed Aug. 6, 1926  2 Sheets-Sheet 1

INVENTOR
Verne Monroe
By Green & McAllister
His Attorneys

WITNESSES

July 29, 1930.  V. MONROE  1,771,808
FISHING TOOL
Filed Aug. 6, 1926   2 Sheets-Sheet 2
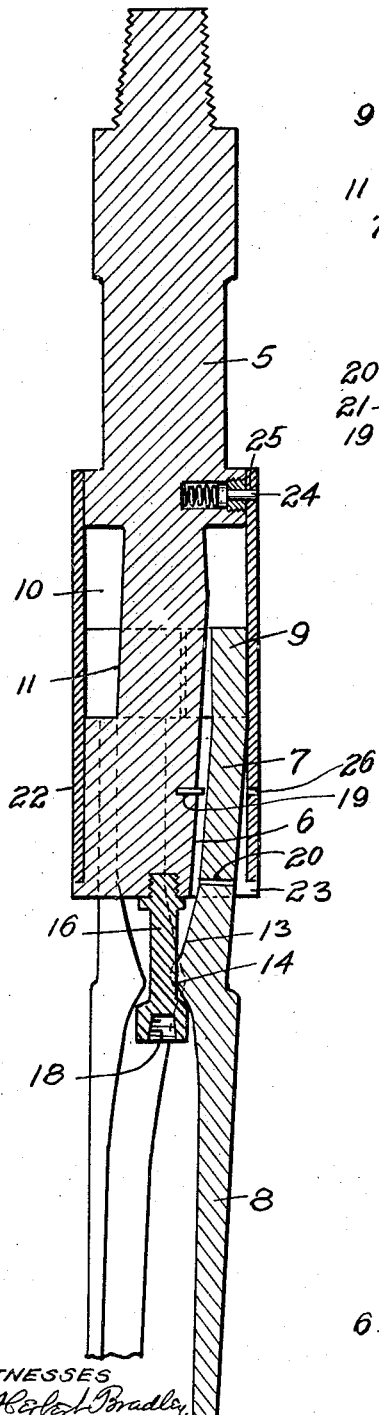
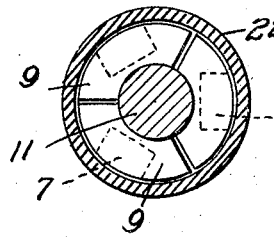
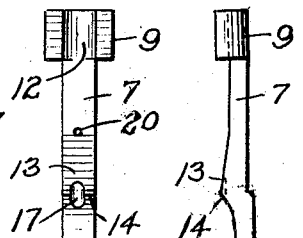
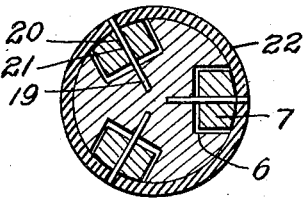
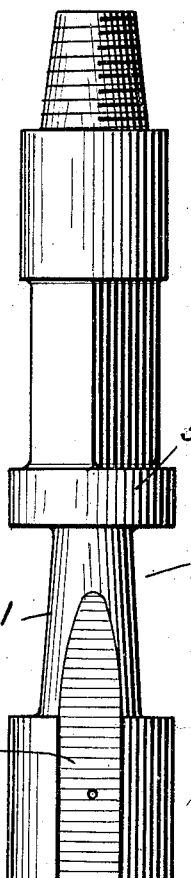
INVENTOR
Verne Monroe
By Green & McAllister
His Attorneys Patented July 29, 1930

1,771,808

UNITED STATES PATENT OFFICE

VERNE MONROE, OF CAMERON, WEST VIRGINIA

FISHING TOOL

Application filed August 6, 1926. Serial No. 127,553.

This invention relates to tools for use in connection with oil, gas or similar wells and more particularly to an improved form of working head for such tools.

An object of this invention is to provide a well tool working head capable of being used with different types of tool elements such, for example, as spuds, rope grabs, rasps, etc., and hence to provide a single working head having a wider range of use than has heretofore been possible.

A further object is to provide a device of the type set forth which is of simple, rugged construction, easy to manufacture and assemble and reliable and durable in operation.

Figure 1:
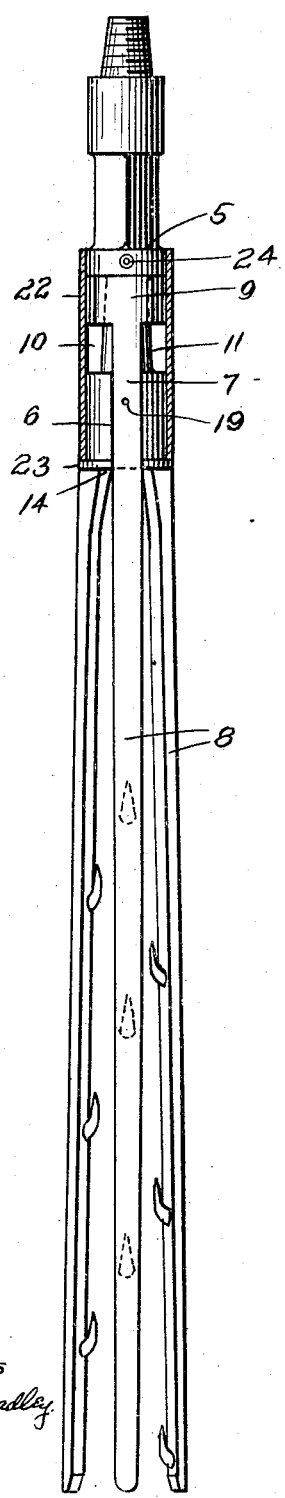
Figure 2:
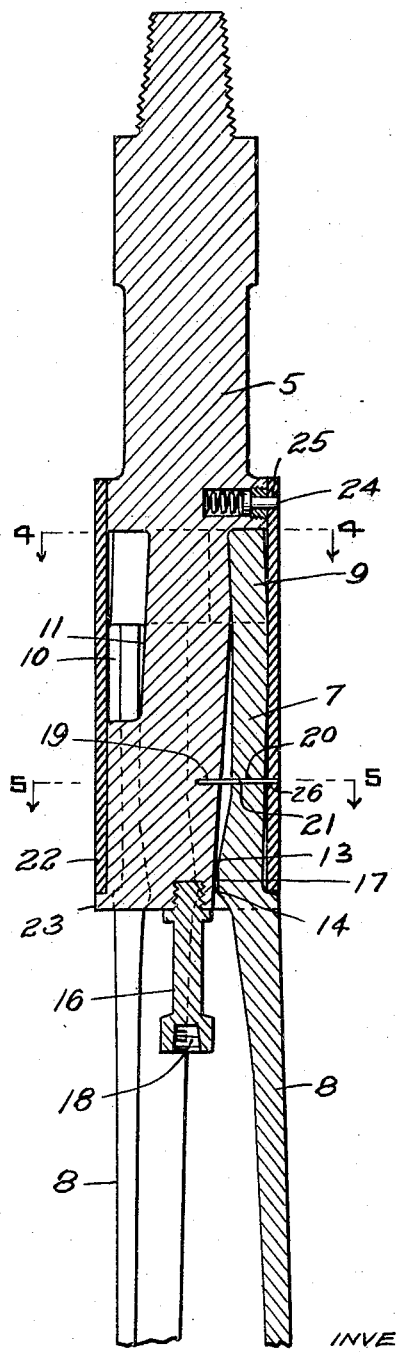

These and other objects which will be apparent to those skilled in this particular art are accomplished by means of the invention illustrated in the accompanying drawings, wherein Figure 1 is a view in elevation of a well tool constructed in accordance with one form of this invention. Fig. 2 is a central sectional view of the operating head illustrated in Fig. 1, showing certain tool elements in expanded position. Fig. 3 is a view similar to Fig. 2, showing the tool elements in contracted relation. Figs. 4 and 5 are transverse sectional views on the lines 4—4 and 5—5, respectively, of Fig. 2. Fig. 6 is a view in elevation of the working head and Figs. 7 and 8 are similar views of one form of tool element adapted to be used in connection with the working head.

The particular embodiment of this invention which has been chosen for the purposes of illustration includes a generally cylindrical tool head having longitudinally extending grooves for receiving the shanks of tool elements such, for example, as the illustrated rope grabs.

The upper portion of the tool head is provided with an annular recess for receiving the heads of the various elements and the engaging surfaces of the tool head and the tool elements are so formed that relative longitudinal movement between the elements and the head causes a rocking motion of the former so that when they are in one extreme position their projecting portions will be separated, while in the other extreme position they will be contracted. It will, of course, be understood by those skilled in the art that with certain tool elements the expanded position will be the operative position, while with other elements the contracted position is the operative position. Means are provided for normally and yieldably preventing movement of the tool elements when this is desirable as, for instance, when lowering the tool into a well.

As illustrated, the invention includes a tool head 5 of substantially cylindrical form having longitudinally extending grooves 6 spaced circumferentially therearound. The shanks 7 of tool elements such, for example, as the rope grabs 8 are slidably received within the grooves 6 and the operating portions of the various elements extend downwardly below the working head. Relatively rugged T-heads 9 are received within an annular circumferential head receiving recess 10 formed in the cylindrical member above the shank receiving grooves 6 and the head receiving recess is of such size compared to the heads themselves that the tool elements are slidable longitudinally of the tool or working head 5.

The depth of each groove 6 is greater than the thickness of the tool shanks 7, see Fig. 2, and the circular bottom 11 of the annular recess 10 is of generally conical shape so as to converge upwardly. The head engaging surface 12 of each tool element 9 is inclined so as to generally conform to the co-operating inclined bottom 11 of the recess 10 and the shank 7 of each tool is provided with an inclined rocking surface 13 rising to a shoulder 14 adapted to cooperate with the outer edge 15 of the grooves 6 so as to produce a rocking motion of the tool elements upon longitudinal movement thereof relatively to the tool head 5. This is accentuated by the fact that the bottoms 6' of the grooves are inclined at an angle to the conical bottom 11 of the head receiving recess and the surface of the groove bottoms is extended into the recess 10, see Figs. 2, 3 and 6.

The bottom of the working head 5 is provided with an axially extending plug 16 which may conveniently form a bearing surface for the tool elements when in their lower contracted position and the elements are provided with notches 17 for engaging the surface of the plug 22 when so positioned. In this way the wickers are supported when in their contracted rope gripping position. The lower end of the plug 16 is provided with a threaded opening 18 which provides a joint connection by means of which auxiliary tools such, for example, as sinkers or rope knives may be secured and operated.

Means are provided for normally and yieldably holding such tool elements, for example, as the rope gripping wickers illustrated, in their inoperative position when the tool is being lowered into a well. As illustrated, this mechanism consists of openings 19 in the bottom of the grooves 6 adapted to be aligned with openings 20 formed in the shanks 7 of the tool elements for the purpose of receiving a breakable pin 21 which, when inserted in the aligned openings, will support the wickers 8 in their expanded and non-gripping position.

The tool head is provided with a cylindrical shell 22 which encloses the head and is held in position on an annular flange 23 by a spring pressed detent 24 which extends through a perforation 25 formed in the shell. The shell is also provided with holes 26 in line with the pin openings 19 through which the wicker holding pins may be inserted.

In operation, assuming the rope grabs 8 to be yieldably held in their expanded position by suitable breakable pins 21, as illustrated in Fig. 1, the tool will be lowered into the hole until the wickers have been positioned around the lost rope or cable. When the tool is raised the rope or cable will engage the points of the wickers and resist the upward movement thereof. Such resistance is sufficient to cause the wicker holding pins 21 to be sheared so that the tool elements will move downwardly relatively to the head 5. Such movement, as hereinabove described, causes the wickers to be moved inwardly toward each other and to obtain such a bite upon the lost rope that the points 27 will not pull through the outer strands thereof.

Although I have described what now appears to be a preferred arrangement it will be understood that various changes, additions, omissions and substitutions can be made therein without departing from the spirit of the invention or the scope of the appended claims. What I claim as new and desire to secure by Letters Patent is:

1. The combination in a device of the type described of a tool head, provided with circumferentially spaced longitudinally extending grooves, a circular recess above said grooves, tool elements having shanks and T-heads slidably mounted in said grooves and recesses respectively, the engaging surfaces of said elements and tool head being formed so as to spread said elements upon movement thereof in one direction relatively to said tool head and to contract said elements upon movement in the other direction, holes in said elements and said tool head adapted to coincide so as to receive breakable pins for normally holding said elements in one position.

2. The combination in a device of the type described of a substantially cylindrical tool head provided with circumferentially spaced longitudinally extending grooves having bottoms inclined with respect to the axis of said tool head, a circular recess above said grooves provided with a conical bottom inclined in a direction opposite to the bottoms of said grooves, tool elements provided with shanks slidably received in said grooves and T-heads received in said recess, relatively abruptly inclined surfaces on said shanks adapted to spread the extending portions of said tool elements when moved in one direction relatively to said head and to contract said elements upon movement in the other direction, and holes in said shanks and the walls of said grooves adapted to be alined so as to receive a breakable pin for holding said elements in a predetermined position.

3. The combination in a device of the character described of a tool head having a circular recess formed therein, circumferentially spaced longitudinal grooves below said recess and tool elements slidably mounted in said recess and grooves, the surfaces of said tool elements being adapted to engage the bottom of said recess and grooves and being so formed that on longitudinal movement thereof in one direction relative to said tool head, the elements are contracted and on movement thereof in the opposite direction the tool elements are expanded.

4. The combination in a device of the type described of a tool head having a circular recess formed therein, circumferentially spaced grooves below said recess, tool elements provided with T-headed shanks slidably mounted in said recess and said grooves, a shell surrounding said tool head for holding said tool elements in position thereon, and means for fastening said shell to said tool head.

5. The combination in a device of the type described of a tool head having a circular recess provided with a conical bottom formed therein, circumferentially spaced longitudinal grooves having bottoms inclined in the opposite direction to the bottom of said recess, and tool elements having T-headed shanks slidably mounted in said recess and grooves, each of said shanks having a shoulder thereon adapted to engage the inclined bottom of said grooves when said tool elements are in their uppermost position in said tool head for expanding said tool elements, and means for holding said tool elements in the expanded position.

6. The combination in a device of the type described of a substantially cylindrical tool head provided with circumferentially spaced longitudinally extending grooves having bottoms inclined with respect to the axis of said head, a circular recess above said grooves provided with a conical bottom inclined in a direction opposite to the bottoms of said grooves, tool elements provided with T-headed shanks slidably mounted in said grooves and recess, a shoulder on the lower portion of each of said shanks adapted to engage the bottom of said grooves when said tool elements are in their uppermost position in said tool head for expanding said tool elements, a shell surrounding said tool head for securing the tool elements therein, means for removably fastening the shell to said head, and holes in the said shell, shanks and the bottoms of said grooves adapted to be aligned so as to receive a breakable pin for holding said tool elements in the expanded position.

In testimony whereof, I have hereunto subscribed my name this 3rd day of August, 1926.

VERNE MONROE.